C. M. SAIN.
POSTAL CHECK.
APPLICATION FILED NOV. 21, 1918.

1,311,014.

Patented July 22, 1919.
3 SHEETS—SHEET 1.

---

47619
Office number    (Stub for Issuing Office)    6 3171 Serial number 10 9 8 7 6 5 4 3 2 1   9 8 7 6 5 4 3 2 1 0   9 8 7 6 5 4 3 2 1 0   9 8 7 6 5 4 3 2 1 0
   Eagles          Dollars          Dimes          Cents 47619           Logandale, Nev.              3171
Office number                                serial number
                United States Postal Check Any money order postmaster in the United States of America will pay to the order of the party named on the back hereof the highest amount indicated by the digits in the margins when this check is presented within 60 days from the last day of the month of issue. After that time it will be paid from the Washington office only.

*Engraved Signature*
                      Postmaster General.

(Date Stamp Issuing Office)

------------------------------------------------
Paying Postmaster Detach Coupon on this Line 47619           Logandale, Nev.              3171
Office number                                Serial number
                Coupon for Paying Office
                Not to be Detached by Holder This Postal Check is not good for more than the largest amount indicated in the margins and any alteration or erasure renders it void. The two margins must agree as to the amount.

Eagles         Dollars         Dimes         Cents 10 9 8 7 6 5 4 3 2 1   9 8 7 6 5 4 3 2 1 0   9 8 7 6 5 4 3 2 1 0   9 8 7 6 5 4 3 2 1 0

47619
Office number (Stub to be sent the Washington Office)   3171 Serial number

*Fig. 1.*

Inventor
Charles M. Sain

Witnesses
J. L. Wright

By *[signature]*
Attorney

C. M. SAIN.
POSTAL CHECK.
APPLICATION FILED NOV. 21, 1916.

1,311,014.

Patented July 22, 1919.

```
         To be filled out by the Purchaser of this check
Logandale, Nev.          Date_____

Pay to_____

Residence_____
                                    $
Amount_____
        (In words)                          (In Figures)

Sender_____

Residence_____

Indorsement of Payee_____

Received Payment_____

(Space for formal instructions by P. O. Department)

(Date Stamp of Paying Office)        (Date Stamp of Issuing
                                                    Office)
```

Fig. 2.

Witnesses
J. L. Wright

Inventor
Charles M. Sain

By
Attorney

C. M. SAIN.
POSTAL CHECK.
APPLICATION FILED NOV. 21, 1918.

1,311,014.

Patented July 22, 1919.

(Stub for Issuing Office)

47619 Office number

3171 Serial number 10 9 8 7 6 5 4 3 2 1    9 8 7 6 5 4 3 2 1 0    9 8 7 6 5 4 3 2 1 0    9 8 7 6 5 4 3 2 1 0

Eagles     Dollars     Dimes     Cents

47619 Office number

Logandale, Nev.

3171 Serial number

United States Postal Check

Any money — — — — — — — — — —
ica will — — — — — — — — — —
the highest — — — — — — — —
this check — — — — — — — — —
month of — — — — — — — — —
ington — — — —

*Engraved Signature*
Postmaster General

*Fig. 4.*

(Date Stamp Issuing Office)

Paying — — — — — — — — — —

47619 Office number

Logandale, Nev.

3171 Serial number

Coupon for Paying Office
Not to — — — — — —

This — — — — — — — — — —
amount — — — — — — — — —
renders — — — — — — — —

Eagles     Dollars     Dimes     Cents 10 9 8 7 6 5 4 3 2 1    9 8 7 6 5 4 3 2 1 0    9 8 7 6 5 4 3 2 1 0    9 8 7 6 5 4 3 2 1 0

47619 Office number (Stub to — — — — — — — — —)

3171 Serial number

Inventor
*Charles M. Sain*

Witnesses
*J. S. L. Wright*

By *A. Randolph Jr.*
Attorney

UNITED STATES PATENT OFFICE.

CHARLES M. SAIN, OF LOGANDALE, NEVADA.

POSTAL CHECK.

1,311,014.  Specification of Letters Patent.  Patented July 22, 1919.

Application filed November 21, 1918. Serial No. 263,543.

*To all whom it may concern:*

Be it known that I, CHARLES M. SAIN, a citizen of the United States, residing at Logandale, in the county of Clark and State of Nevada, have invented certain new and useful Improvements in Postal Checks; and I do hereby declare the following to be a full, clear, and exact description of the invention, such as will enable others skilled in the art to which it appertains to make and use the same.

This invention relates to checks, and more particularly to a check specially adapted for use in connection with the postal service.

One of the main objects of the invention is to provide a check of the character stated of simple construction and arrangement by means of which the amount of money to be paid upon the check or order may be accurately indicated by tearing from the body of the check a portion of a stub, the remaining numbers in the margin of the check indicating accurately the amount which is to be paid upon this order.

A further object is to provide a check by means of which the time and work incident to writing out in detail the amount of the order may be eliminated, this amount being indicated accurately by a simple tearing operation, the tab being engaged by a rule or cutter closely resembling that now in use.

Another object is to provide a money order or check composed of two sections, one of which constitutes the original order or check the other constituting a duplicate to be retained by the paying officer, the numerals for indicating the amount of the check being so arranged upon the original and the duplicate as to render it possible to indicate by a single tearing operation upon both sections or parts of the instrument the amount of the check.

Further objects will appear from the detailed description.

In the drawings:

Figure 1 is a front view of a postal check arranged in accordance with my invention.

Fig. 2 is a reverse view.

Fig. 3 is a front view in folded condition showing the coupon or duplicate to be retained by the paying office, the line along which the stub is to be torn being indicated.

Fig. 4 is a reverse view.

Upon the back of the check, as shown in Fig. 2, are printed suitable blanks to be filled in by the purchaser of the check, lines being left for the signature of the payee, and a space left for the formal instructions to be printed by the Post Office Department. When the check is issued, the date of issuance thereof is stamped by the issuing office at the lower right hand side, as indicated, the date of payment being stamped by the paying office at the lower left hand side, as indicated. When purchasing the check, the purchaser obtains postage stamps to the amount of the fee for this check, these stamps being affixed to the face of the check which is obtained, and canceled by the issuing office.

As will be noted from Fig. 1 of the drawings, the body of the check is divided by a line of perforations 1 into an upper or original member 2 and a lower or duplicate member 3. The upper member has printed thereon an order to the effect that any postmaster will pay to the order of the party named on the back of the check the highest amount indicated by the digits in the margin, if the check is presented within sixty days from the last day of the month of issue, this notice being signed by the Postmaster General. Above this statement is printed the title of "United States postal check," the office which issues the check, and the number of this office and the serial number of the check. When the check is issued the date is stamped by the issuing office thereon at the lower left hand corner of the statement referred to, as indicated at 4. A line 5 is printed about the upper portion of the check above the statement referred to above, and the words "Eagles," "Dollars," "Dimes," and "Cents" are printed above this line in spaced relation reading from the left hand side toward the right hand side of the sheet upon which the check is printed. Above each of the words "Dollars," "Dimes" and "Cents" is printed a series of digits, the digits of each series being inclined downwardly toward the right hand edge of the sheet and these digits being arranged in descending order from 9 to 0. Above the word "Eagle" is a series of digits, the digits of this series being also disposed in a row or series inclined downwardly toward the right hand edge of the sheet. As will be noted, this series starts with the digits 1, 0, and then the digits of this series are arranged in descending order starting with 9 similarly to the digits of the other three series. Above these series of digits is a line 6 above which are printed the words "Stub for issuing office." By arranging a cutter or guide member in proper position upon the several series of digits and then tearing this stub from the upper member of the check, the amount of the check issued may be accurately indicated by this simple tearing operation. For instance, if it is desired to issue a check for $10.53, the cutter will be laid so as to tear along the line shown in Fig. 3, the digits remaining upon the upper portion of the member of the check designating accurately the amount of one eagle, five dimes, and three cents, or $10.53.

The lower member 3 of the check constitutes a coupon which is to be retained by the paying office. This coupon is stamped with the number of the issuing office and the serial number, the same as the upper member 2 and has a notice printed thereon that the check is not good for more than the largest amount indicated in the margin. Beneath this notice are printed the words "Eagles," "Dollars," "Dimes" and "Cents," these words being in alinement with the same words at the top of the upper member 2. Beneath each of the words "Dollars," "Dimes" and "Cents" is printed a series of digits, the digits being arranged in descending order from 9 to 0, and each series inclining upwardly toward the right hand edge of the sheet, or oppositely to the corresponding series printed at the top of member 2. Beneath the word "Eagles" is printed a series of digits similar to the series printed above the same word at the top of the sheet and inclined oppositely thereto. Beneath the series of digits is printed a line beneath which are printed the words "Stub to be sent to the Washington office."

When issuing a check, the upper section 2 is folded backwardly and downwardly along the center line 7 so as to be positioned directly back of the lower section 3, the series of digits of this upper section being in exact register with the series of digits of the lower section. By placing a cutter or guide member, which is provided with a plurality of adjustable guide shoulders, in proper position so as to have its cutting edge extending along the line indicated in Fig. 3, the upper and lower members 2 and 3, respectively, may be torn at a single operation so as to indicate upon both of these members simultaneously the amount for which the check is actually issued. After this has been done, the stub which has been torn from the upper member 2 is retained by the issuing office, the stub torn from the lower member or coupon being sent to the head office at Washington. By means of these stubs, the amount of any check presented can be readily ascertained thus rendering it possible to readily detect any falsifying of the check. At the time that the original check is made out, a duplicate may also be made out by the purchaser, this duplicate being folded and torn together with the original check and filed in the issuing office so that, in the event of loss or destruction of the original check, the purchaser thereof may obtain payment by means of this duplicate. The original check and duplicate may thus be both produced simultaneously at a single tearing operation, this tearing operation also serving to indicate upon the upper member 2 of the original check and upon the lower member 3 the amount of this check. When the check is paid, the coupon 3 is detached by tearing along the line of perforations 1, this coupon being retained by the paying office for purposes of verification.

By rendering it possible to indicate accurately upon the check by a simple tearing operation the exact amount for which the check is issued, I do away with all necessity for subsequent entry of this check and the amount thereof in a record book for verification purposes. Also, since the amount can be indicated accurately by a simple tearing operation, the work incident to writing out the amount of the check, such as is now done, as well as the time incident thereto, is eliminated thus effecting a material saving in both time and work. In view of the vast number of money orders which are issued every day at the various post offices throughout the country, this is in itself a very important feature of my invention. In addition to effecting this very material saving in time and labor, I also greatly reduce the amount of bookkeeping in connection with orders or checks of this character.

What I claim is:

In a postal check, a sheet of material divided into an upper member and a lower member by a transverse line of perforations, said numbers having like identifying data, said upper member having printed thereon an order for payment of the check, the upper member being further printed to designate coins of different denominations, a series of digits being printed above each denomination in numerical order and each series being inclined downwardly toward the right hand edge of the sheet of material, the lower member of said check having printed adjacent the bottom thereof the names of coins of different denominations, these names corresponding to the names at the top of the upper member and in alinement therewith, the lower member being further provided beneath each name with a series of digits corresponding to the series at the top of the upper member and inclined oppositely thereto whereby, by folding the upper portion or member of the sheet downwardly and rearwardly into contact with the back of the lower member, the various series of digits may be brought into register so that the amount for which the check is issued may be indicated upon both the upper and lower members thereof simultaneously by a single tearing operation so as to remove certain of the digits of the different series, the remaining digits indicating the amount of the check.

In testimony whereof I affix my signature in presence of two witnesses.

CHARLES M. SAIN.

Witnesses:
E. L. LILJENQUIST,
W. H. LYON.

Copies of this patent may be obtained for five cents each, by addressing the "Commissioner of Patents, Washington, D. C."